United States Patent [19]

Bateman et al.

[11] 3,925,751
[45] Dec. 9, 1975

[54] GLIDE SLOPE WARNING SYSTEM WITH A VARIABLE WARNING RATE

[75] Inventors: Charles Donald Bateman, Bellevue; Hans Rudolf Muller, Kirkland, both of Wash.

[73] Assignee: Sundstrand Data Control, Inc., Redmond, Wash.

[22] Filed: Apr. 2, 1975

[21] Appl. No.: 564,505

[52] U.S. Cl.......................... 340/27 AT; 340/384 R
[51] Int. Cl.² .......................................... G08G 5/00
[58] Field of Search ....... 340/27 AT, 27 NA, 27 SS, 340/27 R; 340/384 R

[56] References Cited
UNITED STATES PATENTS
3,581,014   5/1971   Vogel .............................. 340/27 R Primary Examiner—Thomas B. Habecker
Attorney, Agent, or Firm—Michael B. McMurry; Ted E. Killingsworth

[57] ABSTRACT

In a system where the aircraft's distance below a radio glide slope is compared with the aircraft's altitude above ground to generate either an advisory voice warning or a command voice warning depending upon the aircraft's altitude and distance below the radial glide slope beam, the repetition rate of the advisory voice warning is varied as both a function of distance below the radio glide slope beam and of altitude in order to generate advisory warnings at a rate reflecting increasing danger to the aircraft. This is accomplished by integrating the glide slope deviation signal over time and comparing it with a radio altitude signal so as to generate a signal for triggering the advisory warning as a function of the glide slope deviation and the radio altitude thereby generating the advisory warnings as a function of decreasing radio altitude and increasing deviation from the glide slope.

13 Claims, 5 Drawing Figures

GLIDE SLOPE WARNING SYSTEM WITH A VARIABLE WARNING RATE

BACKGROUND OF THE INVENTION

The invention relates to aircraft ground proximity warning systems and in particular to warning systems utilizing a glide slope radio beam and a radio altimeter to generate voice advisory warning and voice and command warnings depending upon the aircraft's altitude and deviation from the glide slope.

In the prior art, specifically the U.S. Patent application of Bateman, Ser. No. 480,727, entitled "Aircraft Ground Proximity Warning Instrument", filed on June 19, 1974, and the U.S. Patent application of Bateman entitled "Below Glide Slope Advisoy Warning System for Aircraft", Ser. No. 540,476, filed on Jan. 13, 1975, both of which are assigned to the assignee of this application, an advisory voice warning is generated when the aircraft descends a predetermined distance below the radio glide slope above a specified altitude and a command type voice warning is generated when the aircraft descends below a second predetermined distance below the glide slope below this altitude. Panicello et al., U.S. Pat. No. 3,808,591 discloses a digital method for generating a voice message in an aircraft. The advisory warning typically uses the words "glide slope" in order to give the aircrew an indication that they are somewhat below the glide slope and the command warning typically uses the more imperative phrase "pull up" indicating that they should take corrective action immediately. The glide slope combined with the radio altitude serves to define a safe zone of operation so that whenever the aircraft descends below the glide slope, a predetermined amount for a particular altitude, either the advisory warning or the command warning will be generated depending upon the aircraft's distance from the safe zone of operation.

It has been determined, however, that in order to give the aircrew some appreciation of the relative danger of the aircraft's operation with respect to the glide slope and altitude that it would be desirable to increase the advisory voice warning repetition rate as a function of the aircraft's deviation below the glide slope and the aircraft's actual altitude above the ground. In this manner, the aircrew may be apprised of the fact that the aircraft is increasing its penetration into the unsafe zone of operation and toward the command warning area by means of increasingly frequent advisory warnings. Of course, when the aircraft is in actual danger of impacting the ground, the command warning will replace the advisory warning in order to provide the aircrew with explicit instructions on how to rectify the situation. Of course, the concept of increasing the repetition rate of a warning signal is not entirely new, such a system for varying the frequency of audio warning as a function of the aircraft's closure rate with the ground is disclosed in the U.S. Patent to Astengo, No. 3,715,718 and the application of Astengo, Ser. No. 418,575, filed on Aug. 11, 1970, both of which are assigned to the assignee of this application. However, the use of a vocal warning in an advisory capacity where the repetition of the vocal warning serves to give the aircrew explicit information concerning the aircraft's deviation from a glide slope rather than just a somewhat anonymous tone of varying frequence, provides an improvement over the prior art which is extremely useful from a practical operating viewpoint.

SUMMARY OF THE INVENTION

It is therefore an object of the invention to provide a glide slope warning system wherein the frequency of the advisory voice warning is varied as a function of the aircraft's deviation from the glide slope.

It is another object of the invention to provide a glide slope warning system for aircraft wherein the frequency of the advisory warning is varied as a function of increasing deviation from the radio glide slope and decreasing radio altitude.

It is an additional object of the invention to provide a glide slope warning system for aircraft utilizing a radio glide slope beam and a radio altimeter for generating an advisory voice warning above a predetermined altitude and a command voice warning below that predetermined altitude wherein the frequency of the advisory voice warning increases with increased deviation from the radio glide slope beam and decreasing radio altitude.

It is a further object of the invention to provide a glide slope warning system for varying the frequency of the advisory voice warning as a function of deviation from a radio glide slope beam and as a function of decreasing altitude wherein the radio glide slope deviation signal is integrated over time and compared with the radio altitude signal to generate a trigger signal for the advisory voice warning.

The glide slope warning system utilizes the combination of a glide slope signal from an instrument landing system (ILS) which indicates the aircraft's angular position with respect to a glide slope radio beam and an altitude above ground signal derived from a radio altimeter. The polarity and amplitude of the glide slope signal indicate the aircraft's relative position with respect to the glide slope radio beam. For example, if the aircraft is below the beam, the glide slope signal will be positive, indicating a "fly-up" condition. The advisory voice warning is generated when the combination of the glide slope deviation signal and the radio altitude signal exceeds a predetermined value above a specified altitude. Normally the advisory portion of the warning system is activated between a maximum altitude of 1000 feet and a minimum altitude of 300 feet. The glide slope signal and the radio altitude signal are scaled to correspond to the number of dots, representing the angular distance, that the aircraft is below the glide slope beam. When the aircraft is in the advisory region, between 1000 and 300 feet, and below the predetermined number of dots, an advisory voice warning is activated.

By the same token, below 300 feet, a command voice warning, for example, a command for the crew to pull up, is generated when the combination of the glide slope deviation signal and the radio altitude signal exceeds a specified value. Generally, the number of dots of deviation from the glide slope is increased for the command warning as compared to the number of dots allowed below the glide slope signal for an advisory warning. Once the aircraft has descended below 150 feet, it is assumed that the aircraft is fairly close to the end of the runway and is therefore fairly close to the source of the radio glide slope beam. As the aircraft approaches the source of the glide slope radio beam, even a minor change in altitude will result in a fairly substantial angular change thus generating a glide slope deviation signal representing the large number of dots. So, in order to reduce the sensitivity of the warning system in terms of the number of dots required to trigger a warning as the aircraft approaches the end of the runway, the sensitivity of the system is reduced on a linear basis from 150 feet to 50 feet. Below 50 feet both types of warnings are inhibited in order to prevent nuisance warnings as the aircraft approaches touch down.

In order to vary the repetition rate of the advisory warning as a function of increasing glide slope deviation and decreasing altitude, a variable rate control circuit is provided to generate advisory voice warning triggering signals in response to the radio altimeter signal and glide slope deviation signal. These advisory voice warning triggering signals are then utilized as input to a voice warning generator in order to generate the actual advisory warning. The variable rate control circuit responds to an enabling signal from a warning signal generator that indicates that the aircraft has entered the advisory warning region. This enabling signal will cause the variable rate control circuit to immediately generate an advisory voice warning triggering signal. If the aircraft remains within the advisory warning region, the variable rate control circuit will integrate the glide slope deviation signal over time. This signal, so integrated, is compared to the radio altitude signal and when they are equal, a comparator will generate an advisory voice warning signal triggering pulse which serves to cause the voice warning generator to generate an advisory voice warning. While the voice warning is in progress, the integrator will be clamped bringing its output back to zero. After the voice warning has been terminated, the integrator will again begin to generate a signal proportional to the glide slope deviation signal over time. The net result of the input of the glide slope deviation signal and the radio altitude signal into the variable rate control circuit will be the generation of advisory voice warning triggering pulses that increase in repetition rate as a function of increasing glide slope deviation and decreasing radio altitude. Of course, if the aircraft should enter the command warning area, the advisory warnings will be discontinued and the command voice warnings will be generated.

DETAILED DESCRIPTION OF THE INVENTION

Figure 1:
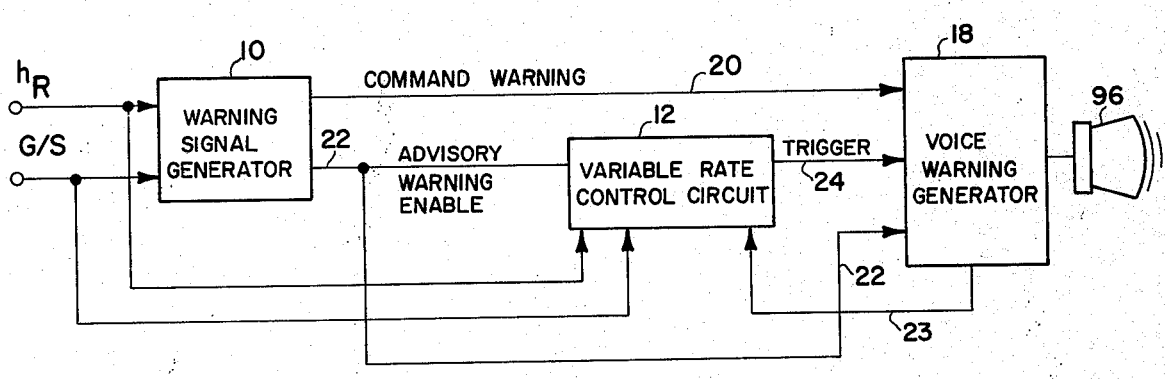
FIG. 1 is a functional block diagram of the glide slope warning system including the variable rate control circuit.
Figure 2:
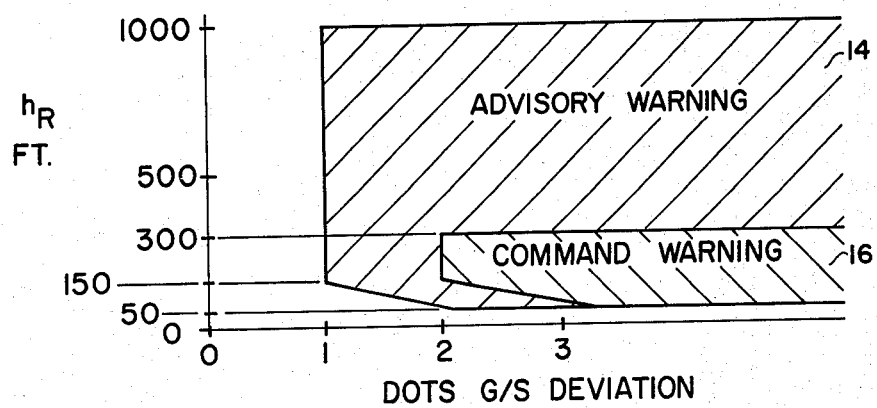
FIG. 2 is a graphical illustration of the advisory and command warning envelopes with respect to altitude and glide slope deviation.

In the block diagram of FIG. 1 the radio altitude signal $h_R$ and the glide slope deviation signal G/S are utilized as input to both the warning signal generator 10 and the variable rate control circuit 12. The warning signal generator 10 generates both command warning signals and advisory warning signals that correspond to the warning envelopes shown in FIG. 2. The advisory and command warning envelopes, as illustrated in FIG. 2, are set forth in terms of the aircraft's deviation from the glide slope and altitude above ground. The horizontal axis of FIG. 1 represents the aircraft's deviation below the glide slope as measured in dots, and the vertical axis represents the aircraft's altitude above ground as measured by a radio altimeter. The shaded area 14 represents the advisory portion of the envelope and extends from a maximum altitude of approximately 1000 feet to a cut off altitude of about 50 feet. The command warning area, represented by the cross-hatched portion 16, extends from a maximum altitude of approximately 300 feet to the cut off altitude of 50 feet. As shown in FIG. 1, an advisory warning is generated when the aircraft is one or more dots below the glide slope at an altitude of 150 to 100 feet and similarly, a command warning is generated when the aircraft is two or more dots below the glide slope at altitudes of between 150 to 300 feet above the ground. The command warning signal is transmitted to the voice warning generator 18 over the line 20. By the same token, an advisory warning enabling signal is transmitted from the warning signal generator 10 to the variable rate control circuit 12 over the line 22. When the aircraft is in the advisory portion 14 of the warning envelope, the variable rate control circuit 12 generates a trigger signal on line 24 which in turn causes the voice warning generator 18 to generate one advisory voice warning. In addition, the enabling signal on line 22 serves to enable the voice warning generator 18, thereby permitting it to generate either a command warning or an advisory warning.

Figure 3:
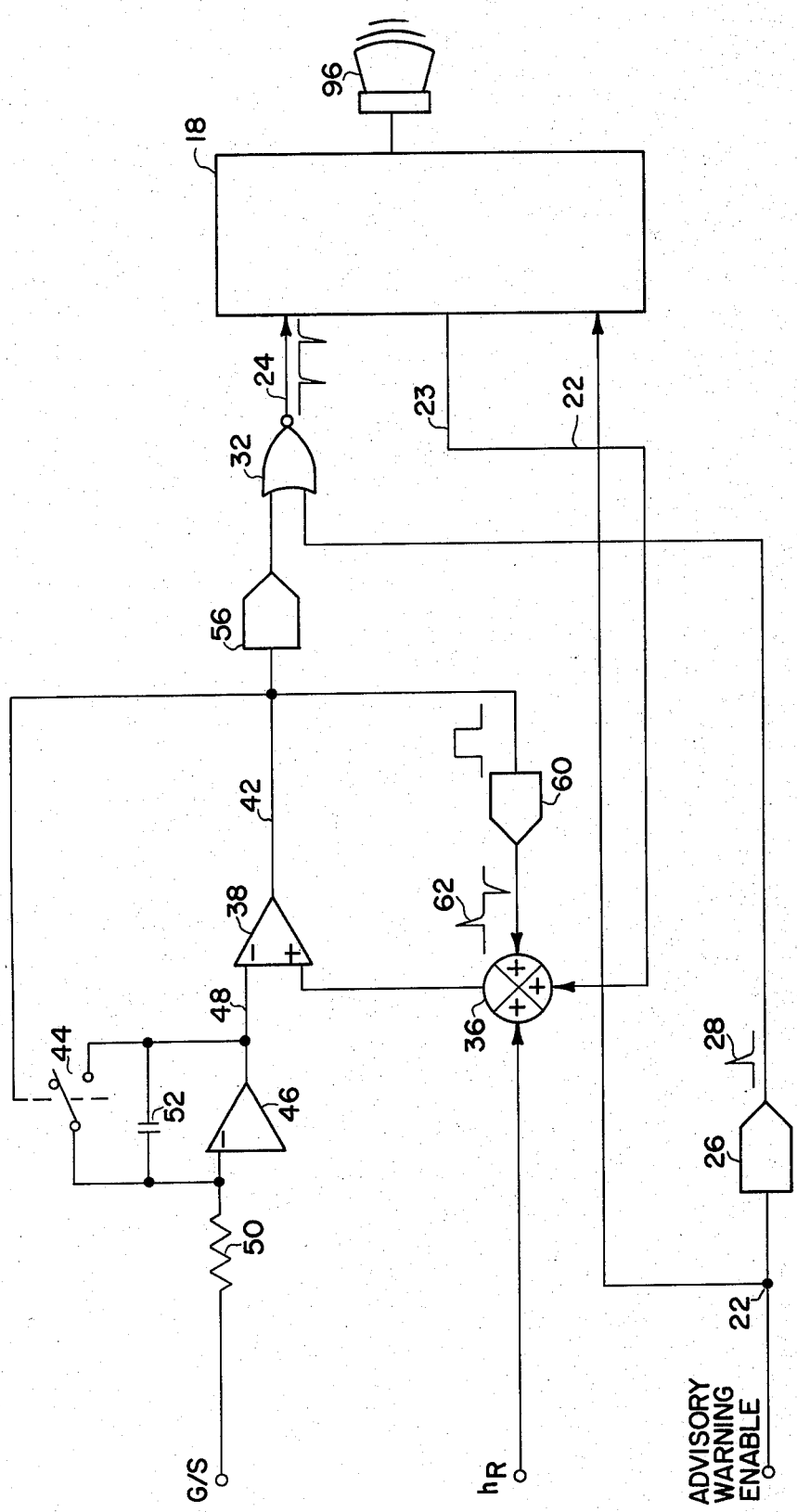
FIG. 3 is a schematic diagram of the variable rate control circuit.

In FIG. 3, the preferred embodiment of the variable rate control circuit 12 of FIG. 2 is set forth. As the aircraft enters the advisory area 14 of FIG. 2, the warning signal generator will place a high signal on line 22, serving to enable the voice warning generator 18. The high signal on line 22 also causes the pulse shaper 26 to generate a short pulse 28 that corresponds to the waveform shown in line 30 of the timing diagram in FIG. 4. This initial signal is transmitted from the pulse shaper 26 to the NOR gate 32 resulting in a short negative pulse on line 24. It is this pulse on line 24 that causes the voice warning generator 18 to produce the first advisory voice warning i.e. "glide slope". During the time that the advisory voice warning is being generated by the voice warning generator 18, which is normally in the neighborhood of 1 second, a high signal will be generated on line 23. The characteristics of the signal on line 23 are shown by the waveform 34 in the timing diagram of FIG. 4. The pulse on line 23 is then transmitted through the summing junction 36 to the positive terminal of the comparator 38 resulting in the comparator output shown by the waveform 40 in FIG. 4. The effect of a positive output from the comparator 38 on line 42 will be to cause the clamping switch 44 to close, thereby causing the output of the integrating amplifier 46 to go to zero. Integrator 46 is connected to the negative input terminal of the comparator 38 by means of the line 48.

When the first advisory voice warning has been completed by the voice warning generator 18, the signal on line 23 will go low resulting in the unclamping of the integrator amplifier 46. At this point, the integrating amplifier 46 begins to respond to the G/S signal that is being used as an input, through resistor 50, to the negative terminal of the integrating amplifier 46. The output of the integrating amplifier 46 ramps in a negative direction as governed by the time constant defined by the capacitor 52 and the resistor 50. The output of the integrating amplifier 46 on line 48 is illustrated by the waveform 54 in FIG. 4. As indicated by the waveform 54, the rate at which the output 46 of the integrating amplifier increases will be proportional to the magnitude of the G/S signal.

Another input to the variable rate control circuit 12 is the $h_R$ signal which represents the aircraft's altitude above ground. The $h_R$ signal represents the aircraft's altitude above ground by means of a negative voltage which increases with the aircraft's altitude. The $h_R$ signal is applied to the positive terminal of the comparator 38 through the summing junction 36. At the point where negative output of the integrating amplifier 46 is equal to the $h_R$ signal, the comparator 38 will change its output state resulting in a high signal on line 42, thus serving to clamp the integrating amplifier's output on line 48 back to zero. In addition, the positive signal on line 42 will cause the pulse shaper 56 to transmit a short pulse to the NOR gate 32. This will cause the NOR gate to place a very short trigger pulse on line 24 as shown by the waveform 58 of FIG. 4. It is this negative going pulse on line 24 that will cause the voice warning generator 18 to generate another advisory voice warning message.

In addition, the comparator 38 is held in a high state by the positive feedback through the pulse shaper 60. Pulse shaper 60 generates the very short pulse 62 in response to the comparator 38 switching states. In this manner, the comparator's 38 output is switched to a high state by the pulse shaper 60 as soon as an advisory warning is triggered and will be held there by the signal on line 23 until the advisory voice warning has been completed. Normally the comparator 38 will be triggered into a high state and held there by the signal on line 23 until the advisory voice warning message has been completed. Here again, after the advisory voice warning message has been completed, the signal on line 23 will cause the integrating amplifier 46 to unclamp, and the process of generating another ramp voltage on line 48 will resume. This process will repeat itself until the aircraft leaves the advisory warning area 14.

Figure 4:
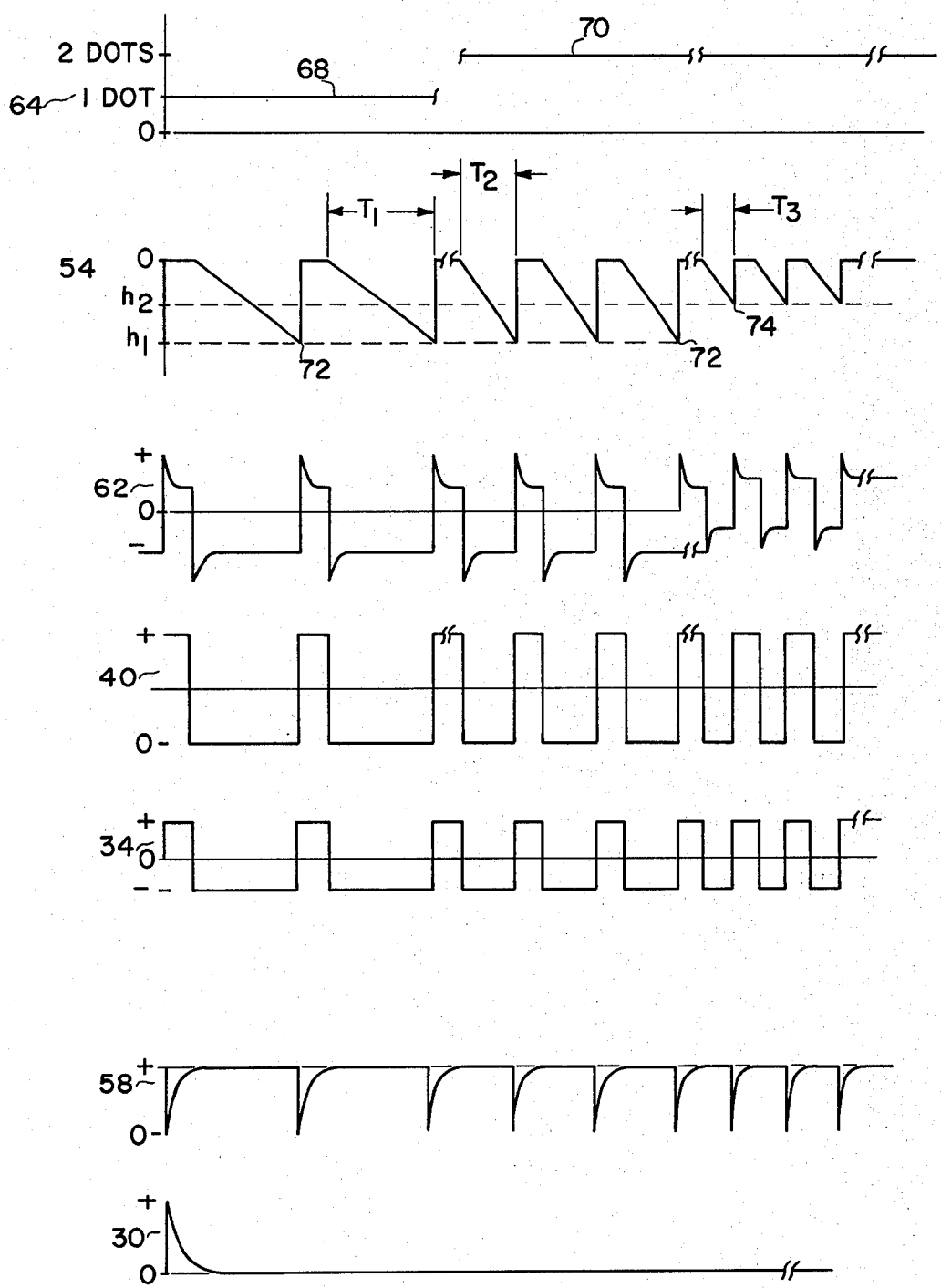
FIG. 4 is a timing diagram illustrating the relationships of the various signals associated with the variable rate control circuit.

The effect of the aircraft's increasing deviation from the glide slope is illustrated by the G/S signal 64 of FIG. 4. Where the glide slope deviation is 1 dot, indicated by the line 68, the time duration between warning signals will be approximately equal to $T_1$, shown by the waveform 54, but where the glide slope deviation becomes equal to two dots, line 70, the effective time between warning signals drops to $T_2$. The corresponding increase in repetition rate of warning signals is illustrated by the waveform 58 that corresponds to the triggering signals generated on line 24 of FIG. 3. The effects of reduced altitude are illustrated by the waveform 54 of FIG. 4. When the altitude is $h_1$, the comparator 38 will be triggered when the ramp voltage of the integrating amplifier 46 reaches the point 72. However, when the aircraft's altitude is reduced to $h_2$, the ramp voltage 74 of the integrating amplifier 46 will equal the voltage applied to the positive terminal of the comparator 38 in less time giving rise to the reduced time $T_3$ between advisory voice warnings. The waveforms presented in FIG. 4 clearly illustrate the relationship between glide slope deviation and radio altitude with respect to increasing or decreasing the repetition rate of the advisory voice warnings. This relationship is defined by the formula $$\Delta T = (RC) \frac{h_R}{G/S}$$

where $\Delta T$ is the time between advisory warnings, $R$ is the value of resistor 50, $C$ is the value of capacitor 52, $h_R$ is the altitude above ground, and $\Delta G/S$ is the change in the glide slope deviation signal.

Figure 5:
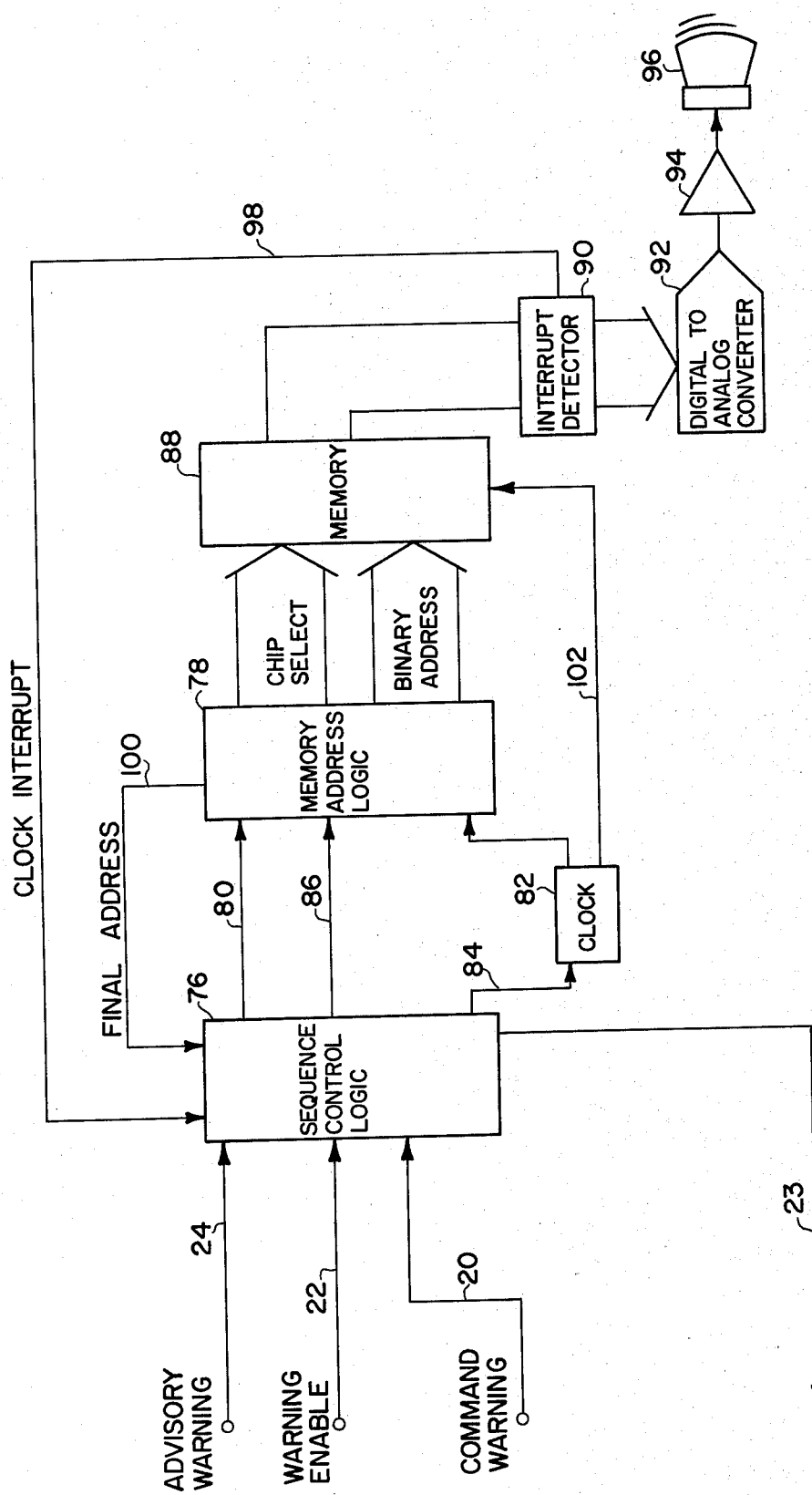
FIG. 5 is a block diagram of the voice warning generator.

An example of a circuit for producing a voice warning by means of digital techniques is set forth in FIG. 5. Here the sequence control logic 76 receives the enabling input over line 22, the command warning signal over line 20, and the advisory warning triggering signal over line 24. After the sequence control logic 76 has been enabled and receives an advisory warning triggering signal over line 24, the memory address logic 78 is enabled by means of an enabling signal sent over line 80. Another enabling signal is transmitted to the clock 82 by means of the line 84. In addition, since this is an advisory warning instead of a command warning, a signal is transmitted from the sequence control logic 76 to the memory address logic 78 over line 86 which serves to define the correct memory addresses for the advisory warning. Thereafter, for each clock pulse, the memory address logic will select the appropriate memory chip and binary memory address in the read only memory 88 in the correct sequence for generating the advisory voice warning. In the preferred embodiment, each memory location will contain a four bit word which is then transmitted from the read only memory 88 through the clock interrupt detector 90 to the digital to analog converter 92. The digital to analog converter converts each of these digital words into an analog signal which in turn is input to the output amplifier 94 resulting in a sequence of audio signals effective to cause the speaker 96 to simulate a spoken word. In order to save space in the read only memory 88, spacing between the voice words is accomplished by reserving a particular word, for example, (1111), for space identification. Whenever this particular spacing word is transmitted to the digital to analog converter 92 the clock interrupt detector 90 will set and transmit a signal over the clock interrupt line 98 to the sequence controlled logic 76. When the sequence control logic receives a set signal over line 98, all memory addressing will halt for a predetermined time period. After this time period has elapsed, the memory address logic 78 will resume sequencing thereby causing the generation of the next voice word. If it is desired to extend the period of time between voice words two or more, space identification words may be set in sequence in the read only memory 88.

After the final address in the read only memory 88 has been read, the memory address logic 78 will transmit a final address signal over line 100 to the sequence control logic 76. This will result in the removal of the enabling signal on line 80 which in turn will serve to initialize the memory address logic back to its first address along with inhibiting it from any further addressing. In addition, the enabling signal is removed from line 84, thereby preventing anymore address read pulses from being transmitted from the clock 82 to the read only memory 88 on line 102.

During the portion of the time that an advisory warning signal is being generated, the sequence control logic 76 will also transmit a set signal on line 23 which, as previously explained, serves to clamp the integrating amplifier 46 of FIG. 3.

It will therefore be appreciated that the circuitry of FIG. 5 is effective to generate either the command voice warning or the advisory voice warning message depending upon the selection of the appropriate sequence of words in the read only memory 88. For example, the command warning is typically composed of the words PULL-UP which would make use of the spacing just described. In addition, to give a note of urgency to the command warning, it is often considered desirable to include an aural siren-like warning between the words PULL-UP such as a WHOOP WHOOP sound. On the other hand, the advisory warning would typically be one word which, for example, might be GLIDE SLOPE. Since the voice generating circuit in FIG. 5 is responsive, in the advisory warning area, to triggering signals over line 22, it is apparent that the repetition rate of the advisory warning i.e. GLIDE SLOPE—GLIDE SLOPE may be changed simply by varying the time intervals between the triggering signals on line 22.

Of course, in addition to the voice warnings just described, it is quite often desirable to provide a visual warning indicator such as an advisory warning light. This light can be activated by the same circuit that activates the voice warning.

We claim:

1. A glide slope warning system for aircraft responsive to a glide slope radio beam and an altitude signal, with a variable warning capability, comprising:
   means for generating a below glide slope voice warning; and
   means for varying the repetition rate of said voice warning as a function of the aircraft's deviation from the glide slope.

2. The system of claim 1 additionally including means for varying the repetition rate of said voice warning as a function of the aircraft's altitude.

3. A glide slope warning system for aircraft responsive to a glide slope radio beam and an altitude signal comprising:
   means responsive to the glide slope radio beam and the altitude signal means for generating a below glide slope voice warning; and
   means for varying the repetition rate of said voice warning as a function of the aircraft's altitude.

4. The system of claim 3 additionally including means, cooperating with said varying means, for varying the repetition rate of said voice warning as a function of ($h_R/GS$).

5. A glide slope warning system, for use by aircraft at airports equipped with a glide slope radio beam, having: means for generating a signal representing the deviation of the aircraft from the glide slope; and means for generating a signal representing the aircraft's altitude above ground comprising:
   means, responsive to the glide slope deviation signal, for generating an advisory warning;
   means responsive to the glide slope deviation signal and the altitude signal, for generating a command warning;
   means for varying the repetition rate of said advisory signal as a function of the glide slope deviation signal and the altitude signal; and
   means responsive to said command signal means and said varying means for generating voice warnings.

6. The system of claim 5 additionally including means, responsive to said command voice warning for generating an audible warning.

7. The system of claim 5 wherein said varying means comprises:
   integrating means, responsive to the glide slope deviation signal, for generating a ramp signal proportional to the glide slope deviation signal;
   comparator means, responsive to the altitude signal and to said ramp signal, for generating a trigger signal for said advisory voice warning.

8. The system of claim 7 wherein said varying means additionally includes enabling means for generating a first pulse of said triggering signal and enabling said voice generating means.

9. The system of claim 8 wherein said voice generating means additionally generates a suppression signal for deactivating said integrating means while an audible warning is being generated.

10. The system of claim 9 wherein said voice generating means includes:
    a digital memory;
    control means responsive to said command warning signal and said varying means, for accessing a sequence of digital words from said memory;
    digital to analog means for converting said digital words to a voice signal.

11. A glide slope warning system, for use by aircraft at airports equipped with a glide slope radio beam, having: means for generating a signal representing the deviation of the aircraft from the glide slope; and means for generating a signal representing the aircraft's altitude above ground, comprising:
    signal means, responsive to the glide slope deviation signal and the altitude signal, for generating a command warning signal and an advisory warning signal;
    an integrating circuit responsive to the glide slope deviation signal for producing a ramp voltage proportional to the glide slope deviation signal;
    a comparator circuit operatively connected to said integrating circuit and responsive to the altitude signal;
    a pulse circuit responsive to said advisory warning signal and operatively connected to said comparator circuit for generating a plurality of triggering pulses proportional in repetition rate to the aircraft's altitude and deviation from the glide slope;
    a voice generator operatively connected to said pulse circuit and said signal means for selectively generating a plurality of command voice warnings or a plurality of advisory voice warnings corresponding to each of said triggering pulses.

12. The warning system of claim 11 wherein said voice generator includes:
    a read only digital memory containing sequence of words corresponding to a command warning and an advisory warning;
    control means responsive to the command warning signal and said triggering pulses for selectively accessing said sequence of digital words corresponding to said command warning; and
    digital to analog converter for converting said sequence of digital words to an audible voice warning.

13. The warning system of claim 12 wherein said voice generator is operatively connected to said comparator circuit and generates a pulse suppression signal while said voice warnings are in progress.

* * * * *

UNITED STATES PATENT OFFICE
CERTIFICATE OF CORRECTION

PATENT NO. : 3,925,751
DATED : December 9, 1975
INVENTOR(S) : Charles Donald Bateman and Hans Rudolf Muller It is certified that error appears in the above-identified patent and that said Letters Patent are hereby corrected as shown below:

In column 5, line 65, that portion of the formula reading "$\dot{h}_R$" should read --$h_R$-- .

In column 7, line 49, that formula reading "$\dot{h}_R/GS$" should appear as follows: $\dfrac{h_R}{G/S}$ Signed and Sealed this Thirteenth Day of July 1976

[SEAL]

Attest:

RUTH C. MASON
*Attesting Officer*

C. MARSHALL DANN
*Commissioner of Patents and Trademarks*

UNITED STATES PATENT OFFICE
CERTIFICATE OF CORRECTION

Patent No. 3,925,751             Dated December 9, 1975

Inventor(s) Charles Donald Bateman and Hans Rudolf Muller

It is certified that error appears in the above-identified patent and that said Letters Patent are hereby corrected as shown below:

Column 7, claim 3, line 42, delete "means";

claim 6, line 67, delete "voice".

Signed and Sealed this

Nineteenth Day of February 1980

[SEAL]

Attest:

SIDNEY A. DIAMOND

Attesting Officer     Commissioner of Patents and Trademarks

UNITED STATES PATENT AND TRADEMARK OFFICE
CERTIFICATE OF CORRECTION

PATENT NO. : 3,925,751
DATED : December 9, 1975
INVENTOR(S) : CHARLES DONALD BATEMAN and HANS RUDOLF MULLER It is certified that error appears in the above—identified patent and that said Letters Patent are hereby corrected as shown below:

Column 7, claim 5, line 62, delete "signal" and substitute --warning--;

line 64, delete "signal" and substitute --warning--;

Column 8, claim 10, line 21, delete "signal".

Signed and Sealed this

Twenty-third Day of September 1980

[SEAL]

Attest:

SIDNEY A. DIAMOND

Attesting Officer

Commissioner of Patents and Trademarks